US006467918B2

(12) United States Patent
Strode et al.

(10) Patent No.: US 6,467,918 B2
(45) Date of Patent: Oct. 22, 2002

(54) VEHICLE EXTERIOR MIRROR ATTACHMENT DEVICES, METHODS AND KITS FOR DISPLAY OF INDICIA

(75) Inventors: Johnathan C. Strode, Tallahasse; Joseph M. Savage, Port Orange, both of FL (US)

(73) Assignee: J. S. Design Company, Tallahasse, FL (US)

( * ) Notice: Subject to any disclaimer, the term of this patent is extended or adjusted under 35 U.S.C. 154(b) by 0 days.

(21) Appl. No.: 09/808,466

(22) Filed: Mar. 14, 2001

(65) Prior Publication Data

US 2002/0131185 A1 Sep. 19, 2002

(51) Int. Cl.[7] .............................................. G02B 7/182
(52) U.S. Cl. ........................ 359/871; 359/872; 359/873; 359/896
(58) Field of Search .................................. 359/871, 872, 359/873, 896, 838; 40/311, 307, 591, 593, 323

(56) References Cited

U.S. PATENT DOCUMENTS

| 1,820,788 | A | * | 8/1931 | Failing ........................ 40/591 |
| 1,910,503 | A | | 5/1933 | Schollmeyer |
| 1,927,913 | A | * | 9/1933 | Bennett ........................ 40/591 |
| 2,182,275 | A | | 12/1939 | Blonkvist |
| 4,834,157 | A | | 5/1989 | Smith |
| 4,915,488 | A | | 4/1990 | Lambert et al. |
| 4,974,355 | A | * | 12/1990 | Abrams ........................ 40/591 |
| 5,133,141 | A | * | 7/1992 | Bane ........................... 40/593 |
| 5,598,653 | A | | 2/1997 | Shcaefer |
| 5,917,666 | A | * | 6/1999 | Kimble ........................ 359/838 |
| 6,003,996 | A | | 12/1999 | Furst |

* cited by examiner

*Primary Examiner*—Mohammad Sikder
(74) *Attorney, Agent, or Firm*—Van Dyke & Associates, P.A.; Timothy H. Van Dyke; Joseph Fischer (57) ABSTRACT

A device for displaying indicia is constructed to fit onto a mirror housing of an exterior mirror of a motor vehicle. The device, upon installation, displays a desired indicia facing the front of the vehicle without obstructing the view of the mirrored surface facing the rear of the vehicle. Variations in structure are provided. Preferred embodiments provide for removal of the device without harm to the mirror housing, and also provide for ready change-out of indicia. The invention also relates to kits and methods employing embodiments of the device.

23 Claims, 8 Drawing Sheets

VEHICLE EXTERIOR MIRROR ATTACHMENT DEVICES, METHODS AND KITS FOR DISPLAY OF INDICIA

FIELD OF THE INVENTION

This invention relates to devices, methods, and kits for displaying indicia, such as college or professional sports logos and designs, company logos, police identification, designs and notices, and the like, on the front side of a side-view mirror housing of cars, trucks, and other vehicles.

BACKGROUND OF THE INVENTION

The art of displaying indicia on various parts of a motor vehicle spans to as early as the 1930s. However, the forward-facing side of a vehicle side view mirror has not been used for such displays. Reasons for this include:

1. the requirement that a device to display indicia fits a variety of sizes and shapes of side view mirror housings, also satisfying the marketing criteria that the device is simply constructed, easy to install, and reasonably priced;
2. the requirement that the device will not obstruct the mirror viewing surface, which could present a danger to driving the vehicle;
3. the requirement that the device withstands the effects of high speeds without substantially shifting its position, falling off, or making undesirable noise; and
4. the requirement that the device withstands the effects of the elements without undue deterioration.

Also, market preferences include that a device is fully and easily removable from a mirror housing, and that indicia are readily interchangeable.

The present invention, as differentiated herein from the references provided below and other devices known to those skilled in the art, satisfies these requirements. Accordingly, the present invention advances the field of displaying indicia on motor vehicles, in particular on the forward-facing side of a vehicle side view mirror.

One example of an early reference is Failing, U.S. Pat. No. 1,820,788. Failing disclosed an automobile identifying device that covered part of an automobile headlight. The device was comprised of a panel, which carried an identifying legend and extended across the face of the headlight, and a body adapted to overlap part of an automobile headlight to secure the device to the protruding headlight. Both parts were of stretchable and substantially transparent material.

Blonkvist, U.S. Pat. No. 2,182,275, disclosed a combination of a rearview mirror and a sign. The indicia on the sign faced inward, toward the driver,:and the device was directed specifically to a rearview mirror situated inside the vehicle. Abrams, in U.S. Pat. No. 4,974,355, disclosed a sign to hang onto a vehicle rearview mirror, hanging from the structure that supported the mirror, with the sign facing frontward.

Bane, U.S. Pat. 5,133,141, disclosed a vehicle rearview mirror cover that comprises (1) a unitary, generally concave body, which includes a back surface and a socket (the latter being the interior of the semi-rigid concave body), and (2) an indicia means. The device fits over the back of a rearview mirror housing, and the device's shape is dictated by the housing shape. As disclosed and subject to this requirement, the device is semi-rigid.

The above patents are directed to rearview mirrors inside of a vehicle. They do not deal with the wind, weather, and other factors that affect the present invention, which is directed to a side view mirror disposed on either exterior side of a vehicle. Other inventions are directed to exteriorly mounted mirrors, including side view mirrors. However, none are directed to the attachment to the mirror housing and the display of indicia as disclosed and claimed herein.

For instance, Smith, in U.S. Pat. No. 4,834,157, teaches a removable cover to protect the exterior exposed surface of-an automobile exterior mirror housing. The objective is to protect the surface from the elements, and from receiving scratches, etc. The device forms a pocket over the entire exterior mirror housing surface, with an open end around the actual mirror surface to allow viewing. Most of the border of the pocket's open end is defined by an elongated seam that snugly engages the mirror housing surface that surrounds the mirror surface. No claim is made to the presence or attachment of any indicia.

Lambert et al., in U.S. Pat. No. 4,915,488, disclose and claim a device for outside mirrors in which an open mesh is used as a shade screen for night driving to reduce the intensity of light from following vehicles. The objective, and limitations, including the means of attachment, differ from the present invention.

Descriptions of other inventions generally in this area are found in U.S. Pat. Nos. 1,910,503, 1,927,913, 5,598,653, 6,003,996, and Belgian Patent No. 566,213.

The present invention satisfies the requirements noted above for displaying indicia on an exterior side view mirror of a vehicle. Although motorized vehicles have been in common use for almost a century, the inventors are unaware of a device such as the present invention that is designed for displaying indicia on exterior mirrors. The references cited do not address the problem solved by the present invention, and in contrast, these references relate to different objectives, employing different limitations in their devices.

The present invention is well suited for mass-production and scale-up techniques.

SUMMARY OF THE INVENTION

The present invention regards a device that displays indicia on an exterior mirror of a motorized vehicle, and which, preferably, does not appreciably move due to wind and weather. An end user also would want a device that is readily removable (for when the display is not desired), does not mar the mirror housing, and has readily interchangeable displays of indicia. Finally, for production, marketing, and pricing, a device should be amenable to mass production, and one size and design should fit a relatively wide range of sizes and designs of vehicle exterior mirror housings. The present invention, in its various embodiments, achieves these objectives.

In contrast to the teachings of the prior art, one embodiment of the present invention employs a readily installable, readily removable foundation device to a front side of a vehicle exterior mirror housing. The foundation has a base structure that fits closely over a portion of the front side. This base is held firmly in place by two or more connectors that reversibly fasten to a portion of the mirror housing.

This foundation may contain indicia on the front face of the base. Preferably, a separate platform attaches to the base, and the platform bears a desired indicum on its front side, the indicum facing the front of the vehicle when installed. The platform may extend beyond the edges of the mirror housing, and so designed has been shown to withstand high speed driving without problem. The platform may be temporarily or more permanently attached to the base, and likewise indicia may be selectively temporarily or more permanently attached to the platform.

A variety of methods of connecting the foundation to the mirror housing are described and claimed. In addition, methods for installation and use, and kits containing devices according to this invention, are described and claimed.

The present invention advances the field of displaying indicia on the front side of exterior mirror housings. Additional objects, advantages, and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

FIGS. 6A,B are perspective views of two styles of braces used in the present invention.

FIG. 7 is a front view of a preferred embodiment of the present invention.

DETAILED DESCRIPTION OF THE INVENTION

According to the present invention, the foregoing and other objects and advantages are attained by the design, manufacture, and use of an attachment device attaching onto an exterior mirror housing of a motor vehicle, where such attachment device displays indicia that are affixable to or are unitary with said attachment device. In addition, methods of fixation onto a mirror housing and kits including one or more attachment devices are described and claimed.

The present invention relates to means to affix indicia to an exterior mirror of a motor vehicle. A preferred means is to place a stretchable foundation to an exterior mirror housing, and then to attach a platform bearing indicia which are viewable when so attached. Other means and variations are described herein.

Figure 1A:
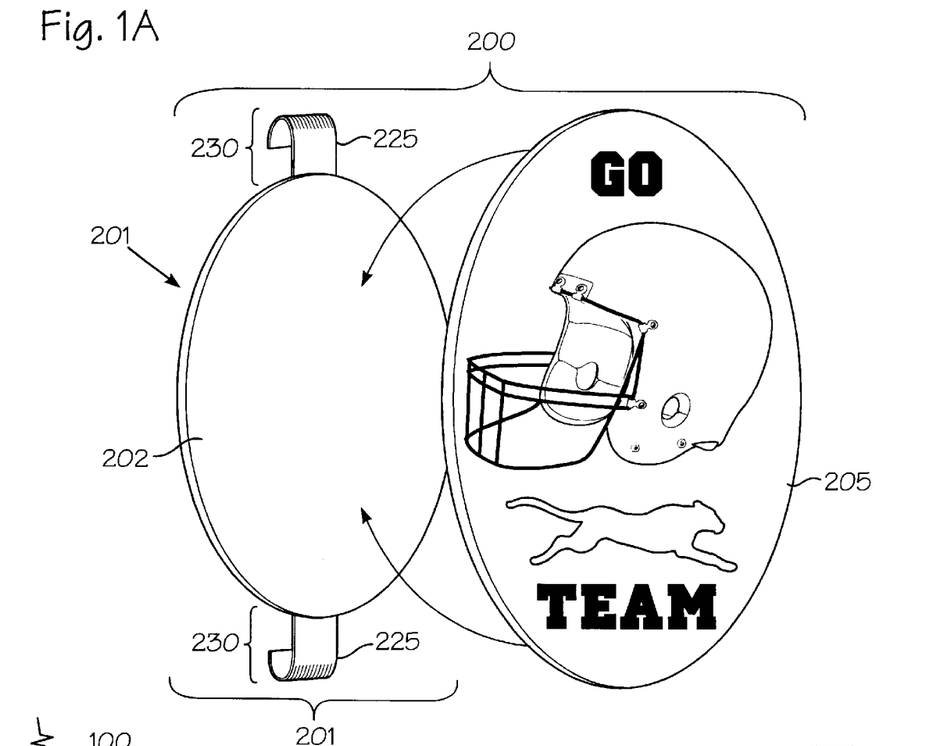
FIG. 1A is a perspective, exploded view of one embodiment of the present invention.

As shown in FIG. 1A, in one embodiment one part of an attachment device, 200, (hereafter also referred to as "device" or "device for displaying indicia") includes a base, 202, preferably of stretchable material. Attached to the base, 202, are two connectors, 230, designed to attach to a portion of the mirror housing. The base, 202, and attached connectors, 230, collectively are referred to as a foundation, 201. The foundation, 201, functionally is a means for attachment of an indicum to the mirror housing, 101, of a vehicle exterior mirror of a motor vehicle, 100 (shown in FIG. 1B).

In FIG. 1A, each connector, 230, merely comprises a hook, 225, directly attached to the base, 202. In addition to the foundation, 201, the attachment device, 200, also comprises an indicia platform, 205. The indicia platform, 205, displays on its front surface a logo, design, identification, or the like, and attaches to the base, 202, in such a way to display that logo, design, or the like, to viewers of the motor vehicle to which the device is affixed. As detailed below, the invention provides a device that overcomes problems typically associated with the display of material on an exterior mirror of a motor vehicle (i.e., this device is: attachable to a variety of sizes and shapes of mirror housings; simply constructed and easy to install; providing an unobstructed view of the mirror viewing surface; and able to withstand the effects of high speeds and the elements).

Figure 1B:
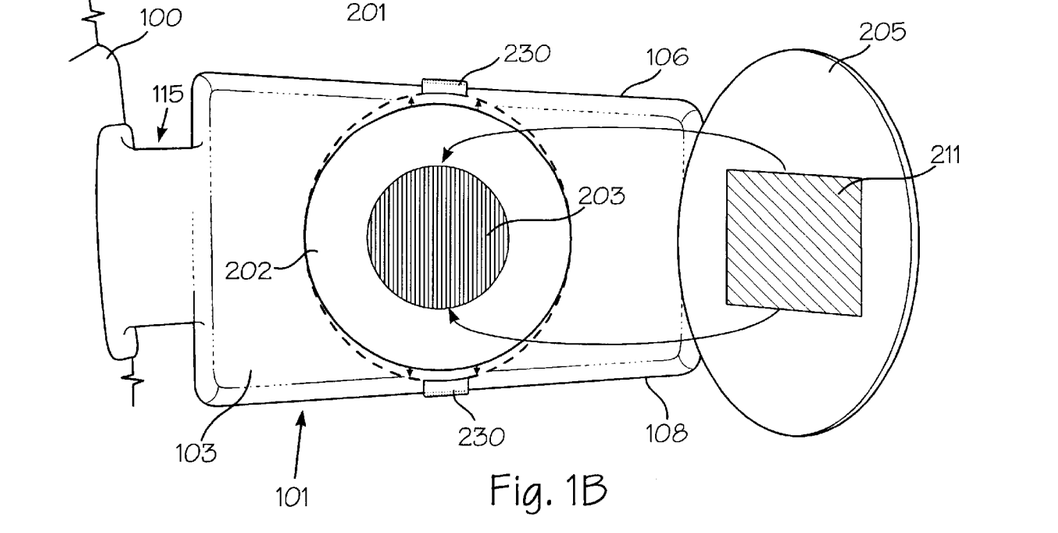
FIG. 1B is a view of one embodiment of the present invention, with part of the device attached to a mirror housing and a second part shown prior to assembly.

A basic design and operation is shown in FIG. 1B. A circular base, 202, extends across a portion of the front side, 103, of a mirror housing, 101, which is attached by a connecting structure, 115, to the motor vehicle, 100. Connectors, 230, attach the base to a peripheral edge (see FIG. 2B) lying beyond the top side, 106, and the bottom side, 108, stretching the material of the base to tauten it against the front side, 103. This stretching, shown by arrows in FIG. 1B, is not specifically indicated in subsequent figures, where such stretching typically takes place although not shown.

This stretching of the base reflects the sizing of the device, such sizing being designed to provide sufficient stretch to sufficiently tauten the foundation, 201, over a wide range of mirrors sizes and shapes. By sufficiently tauten is meant the foundation, 201, bearing indicia itself or on an indicia platform, 205, withstands driving at normal speeds without substantial movement of the base from its original position. In other embodiments, this stretching may be achieved by having a substantially non-stretchable base in combination with stretchable bands, or the like, that are components of the connectors.

FIG. 1B also shows the back, attachment side of the indicia platform, 205, which contains an adherence section, 211. This adherence section, 211, serves to affix the indicia platform, 205, to an art attachment area, 203, on the surface of the base, 202. As shown in the cut-away drawing in FIG. 1C, the indicia platform, 205, is attached to the base, 202, adhering to an art attachment area, 203, on the top surface of the base, 202. Once so assembled, this embodiment displays the front of the indicia platform, 205, toward the front of the motor vehicle, thus displaying for viewers the desired logo, design, identification, or the like. Although the primary objective is to display indicia directed toward the front of the vehicle, additional indicia may be placed on exposed rear surface areas of the indicia platform. Also, ribbons, flags, banners, flyable displays, etc. may attach to the device, and fly rearward during driving positioned to not distract the driver, nor obstruct the driver's view of the mirror).

Figure 1C:
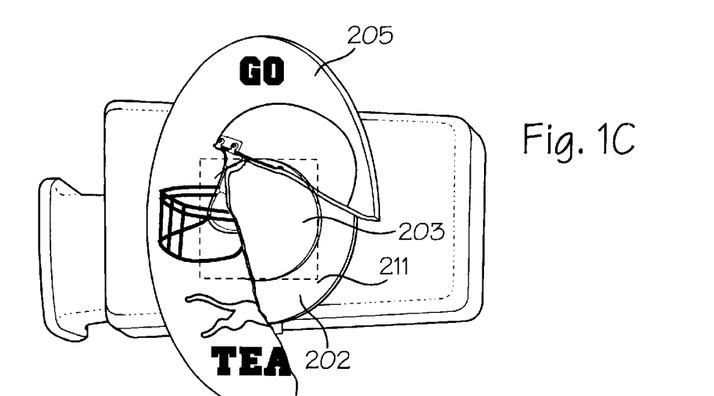
FIG. 1C provides a cut-away front view of the embodiment shown in FIG. 1B, as assembled to a mirror housing.

FIG. 1C shows the indicia platform, 205, attached to the art attachment area, 203, via the adherence section, 211. The cut-away area shows the assembled relationship of these and other aforementioned components. Also, a separate depiction of the front side of the indicia platform, 205, here bearing a tiger profile insignia, is shown to one side of the assembled cut-away drawing.

Having simply described an embodiment of the attachment device according to the present invention, a more detailed discussion, including relevant definitions, are provided for the components of the mirror housing and embodiments of the attachment device.

First, by indicia is meant any display of symbols, pictures, letters, acronyms, abbreviations, or combination of these, such as are used to display or communicate. For instance, indicia include, but are not limited to: college or professional sports logos and designs, company logos, police identification, corporate logos, designs, advertisements and other displays, such material on trucks, mail trucks, buses and the like, out-of-repair notices for stopped vehicles, and other designs and notices, such as to connote political, religious or other affiliations or viewpoints. An indicum is the singular word form of indicia, but as used in the present disclosure, indicia may also refer to a single unit of display. Also, as used herein, a single unit of display may include an assembled collection of two or more different symbols, etc.

A simple method of displaying indicia, according to an alternative embodiment of the invention, is to adhere one part of a two-part system to an exterior mirror housing, and then to attach a body containing indicia to the second part of the system. One example is removably attaching, by an adhesive, one side of a base onto a front portion of an exterior mirror housing, where the base's opposite (front) side also has a surface to which an indicia body is removably attachable. An indicia body therein attached, displays its indicia on the mirror housing. This embodiment is less preferred because the part attached to the mirror housing may not be as easily removable, as other embodiments described and claimed in the present invention. Also should the user keep the base in place without indicia covering it, this may appear unattractive. For instance, if one part of a hook-and-loop type fastening system commonly known as "Velcro®" material, is the base and the adhesive to the mirror is strong, the user may prefer not to remove the base, even when not displaying the indicia. Also, attempting to remove the base from the mirror housing may risk damage to the finish of the mirror housing, depending on ambient conditions (temperature, humidity, etc.) and time of attachment. Also, the sizes and types of possible indicia may be limited in such a system.

A more preferred embodiment of the present invention, referred to herein as a foundation, or foundation device, comprises a base and at least two connectors. A variation of this embodiment has indicia permanently affixed on a portion of the base. This variation, however, provides only a limited space for indicia. Other embodiments include the base and at least two connectors in combination with an indicia platform for the display of indicia. The indicia platform may have the indicia permanently affixed, or may provide for removable indicia such that a user may change indicia as desired.

Figure 2A:
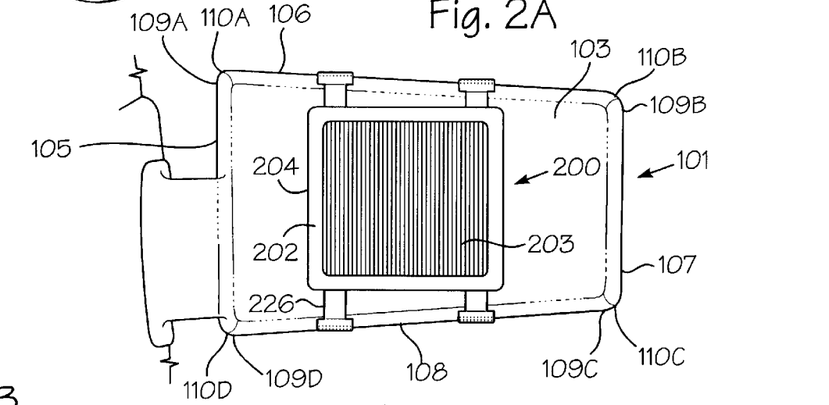
FIG. 2A is a frontal view of an exterior mirror housing with an embodiment of the present invention assembled onto a mirror housing, providing a detailed identification of components.
Figure 2B:
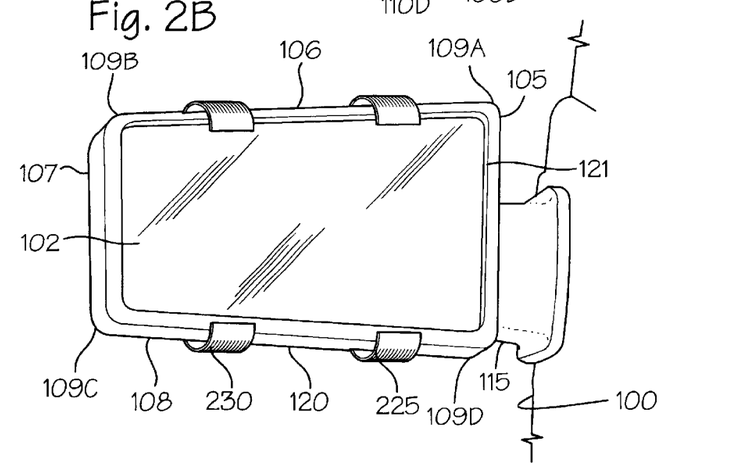
FIG. 2B is a rear view of an exterior mirror housing showing the peripheral edge, the mirror surface, and the rear sides of hooks of the embodiment of FIG. 2A.
Figure 2C:
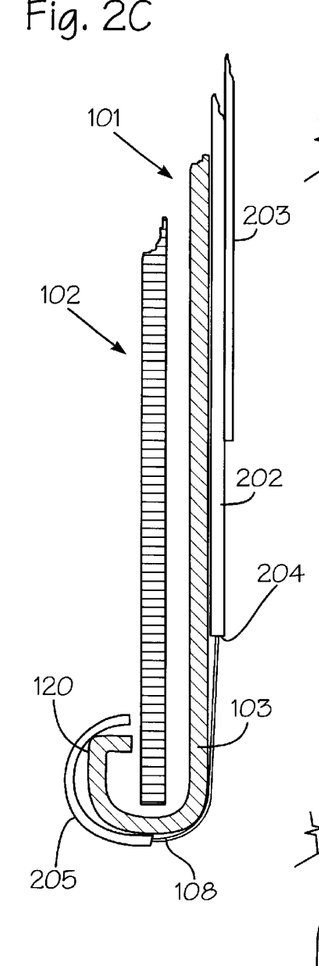
FIG. 2C is a cross-section along the A—A axis of FIG. 2A, showing additional details.

A more detailed presentation of the present invention is shown overlaying a mirror housing in FIGS. 2A–C. FIG. 2A is a front view of the front side of an exterior mirror with an embodiment of the present invention attached. FIG. 2B shows the rear side of the exterior mirror. FIG. 2C provides a cross section along the A—A axis of FIG. 2A, showing additional details and relationships of the mirror and the attached embodiment.

The mirror, as represented in this and other figures herein, comprises the following parts: a minor housing, 101, typically of metal or plastic, and forming a generally smooth, continuous, structure and holding a mirror surface, 102. Said mirror housing comprises a front side, 103 and a back side, 104, defined such in relation to the front and rear of the motor vehicle. Also definable are a proximal side, 105, the side nearest the motor vehicle, a top side, 106, a distal side, 107, and a bottom side, 108. At the juncture of said latter four sides are corners, 109A–D, that comprise a curved extension of a respective pair of adjacent sides, and a center point, 110A–D, that establishes a geometric center of each respective corner.

The components of the attachment device, 200, that are shown in FIG. 2A are as indicated previously, except that here the connector, 230, comprises both a hook, 225, and a band, 226 connecting the hook, 225, to the outer edge, 204, of the base, 202.

As seen in FIG. 2B, at the back end of sides 106–108 is a peripheral edge, 120, that, depending on the design of a particular mirror housing, entirely or substantially surrounds the mirror surface, 102. The peripheral edge, 120, extends from the back end of the sides and inward to surround the mirror surface, 102. The peripheral edge, 120, also establishes the back end of most or all corners, 109A–D, and all or part of the proximal side, 105.

The proximal side, 105, connects the distally lying components of the mirror housing, 101, to the side of the motor vehicle, 100, by means of a connecting structure, 115. The mirror surface, 102, typically is recessed within the ledge, 121, of the peripheral edge, 120, which is situated farthest from the front, side, 103. As shown in FIG. 2B, the hooks, 225, extend across the sides, 106 and 108, and grab around the peripheral edge, 120.

FIG. 2C shows a cross section along the A—A axis of FIG. 2A. Here, the base, 202, stretches over and superposes the front side, 103, of the mirror housing, 101. The art attachment area, 203, here shown as a hook-type fabric, is shown as a layer over the base, 202. A hook, 205, connected to the outer edge, 204, of the base, 202, extends across the bottom side, 108, and attaching around the peripheral edge, 120.

Having established the components of the mirror housing, 101, the components of the attachment device, 200, are further defined and identified herein. A base, 202, is a generally flat material comprising one or more art attachment areas, 203, and an outer edge, 204. The base is typically comprised of stretchable material. One example of an appropriate material is neoprene. Other suitable materials are known to those of ordinary skill in the art. General suitability criteria include: capable of stretching to fit over the mirror housing; not readily degraded by weather and wind; and having sufficient strength to hold an indicia platform without deforming, tearing, or otherwise becoming damaged or overly flexible. The criteria of stretching is not required when the connectors have stretchable component(s).

The base, 202, is designed to overlay a portion of the front side, 103, of the mirror housing, 101. The art attachment area, 203, is of any desired shape that supports the overlying indicia platform, 205. The art attachment area, 203, may be an integral part of the base, 202 (such as if the base is entirely made of the 'hook' or 'loop' type fastening system commonly known as Velcro® fabric), or may be separate, for instance being layered over or applied to the base (such as by gluing 'hook' or 'loop' fastening system fabric onto the base material, or applying adhesive to specific areas of the base), to attach the indicia platform, 205. The art attachment area, 203, also may comprise two or more dispersed specific areas, or areas that attach the outline of the indicia, or a combination of these, such as when sonic welding, riveting, wire or plastic loop fasteners, spot gluing, hot gluing, sewing, the use of snaps, clips, hooks, buttons, magnets, and other such methods of attachment, as are employed in the art, are used to attach the actual indicia, or the indicia platform, 205, to the base, 202.

Regarding overall shape, the base may be square, rectangular, triangular and so forth, or may be shaped like one or more aspects of the shape of a specific indicum. For instance, for a tiger-shaped indicum platform, 206, shown in FIG. 2D, the base, 202, may be manufactured in the form of a tiger, of a size slightly smaller than the indicum platform, 206, to provide a better support and attachment area for this tiger-shaped indicia platform, 206, bearing a tiger indicia, 210T.

Figure 2D:
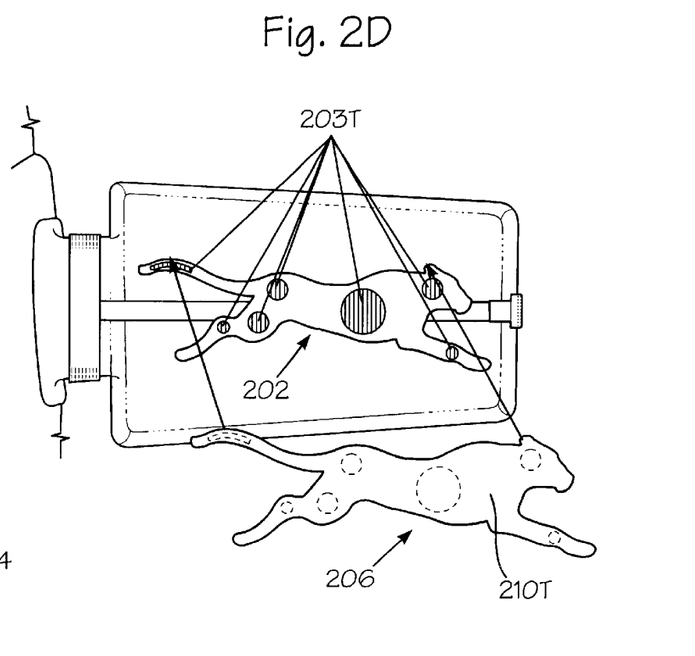
FIG. 2D presents a tiger-shaped indicium with a base having a corresponding shape.

Particularly, the base, 202, in FIG. 2D comprises seven art attachment areas, shown as 203T. In an embodiment such as this; tiger-shaped indicia platform, or where the base is large, several separate art attachment areas are more appropriate than a single art attachment area, as they can be strategically placed, leading to lower costs and potentially easier production (and easier attachment and removal for removable indicia platforms).

For purposes of this disclosure, the outer edge, 204, is defined as the actual perimeter of the base, 202, and a section of the base, 202, adjacent and internal to that perimeter that is used for attachment of connectors. The dotted lines in FIG. 2E, along one corner, represent the general boundaries of the outer edge, 204, for that area.

Figure 2E:
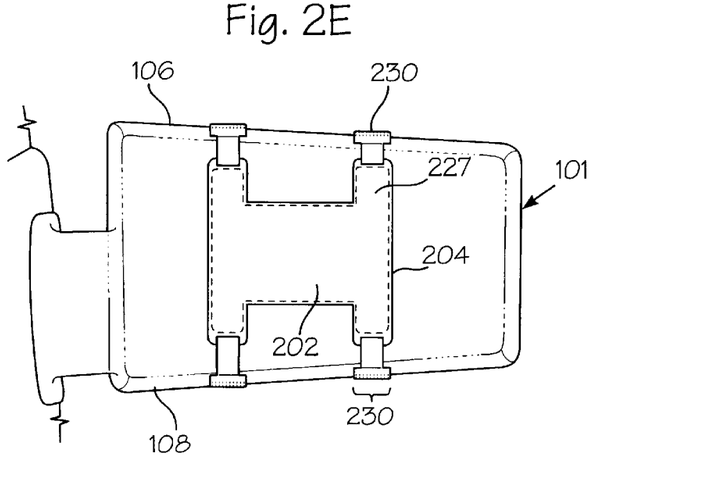
FIGS. 2E and 2F present alternative approaches to construct a foundation having four connectors.
Figures 2F, 2G:
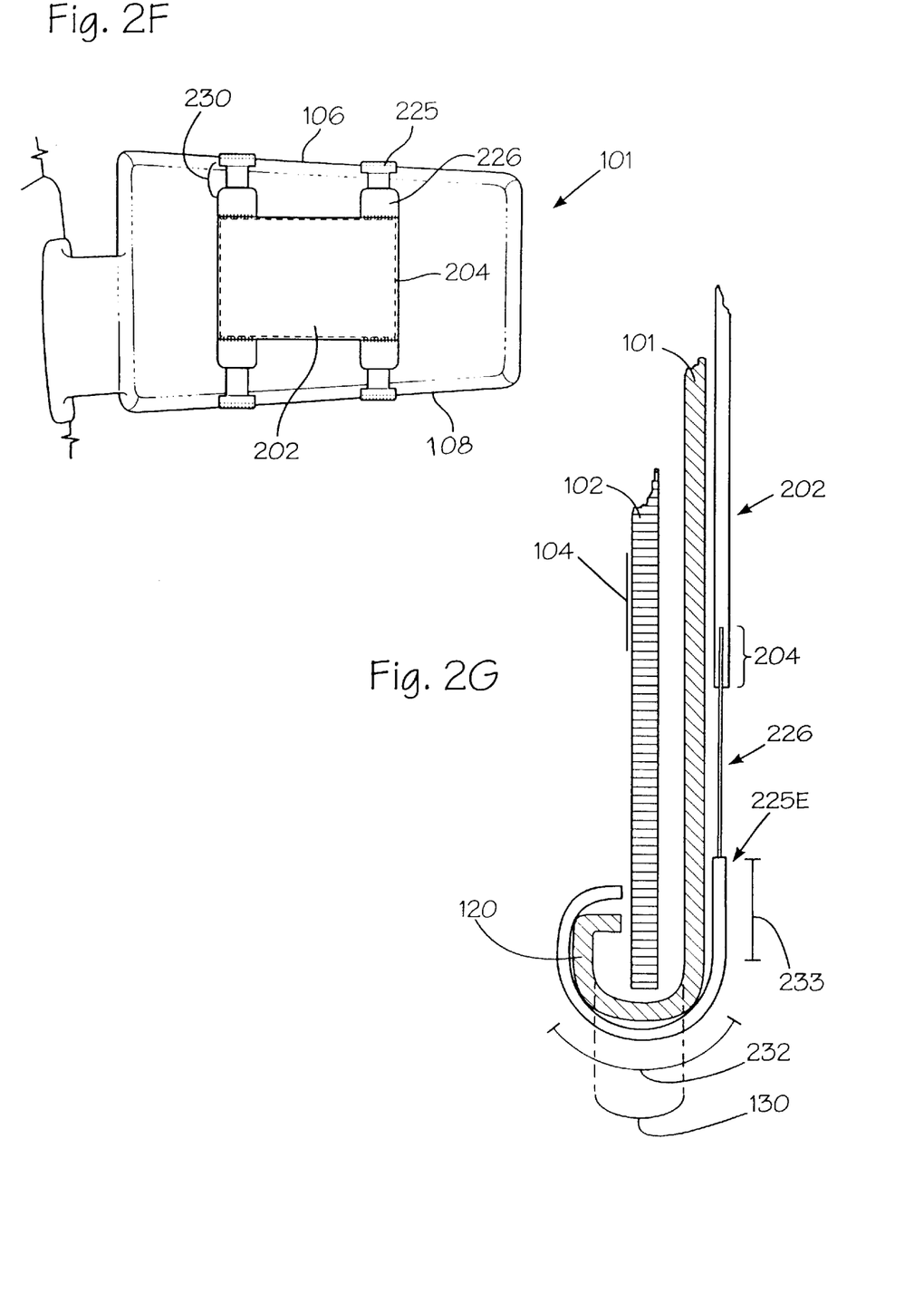
FIGS. 2G–J present alternative structural approaches to attachment to the mirror housing.

FIG. E and FIG. F demonstrate two approaches to base/connector configuration. In FIG. 2E, the base extends almost to the tap and bottom sides, 106 and 108, respectively, of the mirror housing, 101, in that the stretchable material forming the base, 202, is cut to the shape shown, including the noted fingerlike extensions, 227. Here the connectors, 230, simply comprise hooks, 225, which attach directly to the base, 202, along the base's outer edge, 204.

FIG. 2F shows a similar shape. However, here the connector, 230, comprises a hook, 225, and a band, 226, the band, 226, being sewn into a now-truncated shape of the base, 202. The band, 226, may be constructed of stretchable or non-stretchable material. These variations in construction approach are meant to teach alternative configurations of the present invention.

The relationship between the base, 202, and the connectors, 230, is herein defined. A connector is a structure separate from the base, attached to the base at a point near or on the edge of the base, comprising a linkage to connect the base to a section of the mirror housing. A connector may simply comprise a hook attached along an edge section of the base. For instance, FIG. 2E shows four hooks, 225, also known as clips, each of which is directly attached to a finger-like extension, 227, of the base, 202. As shown in cross section drawings FIGS. 2G–I, the hooks comprise curved areas sufficient to wrap around a target structure, such as a portion of the peripheral edge, 120.

Figure 2H:
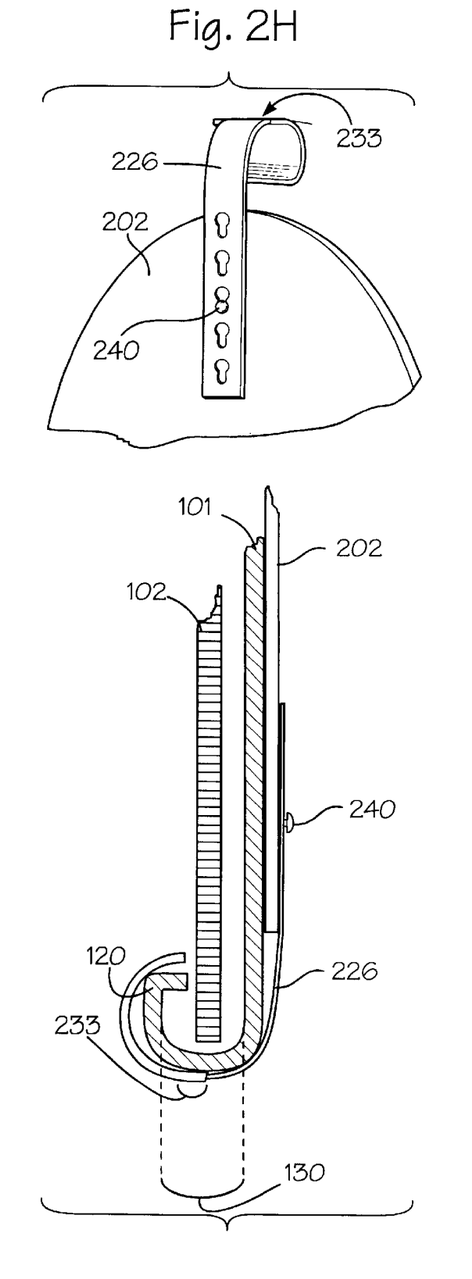
Figure 2I:
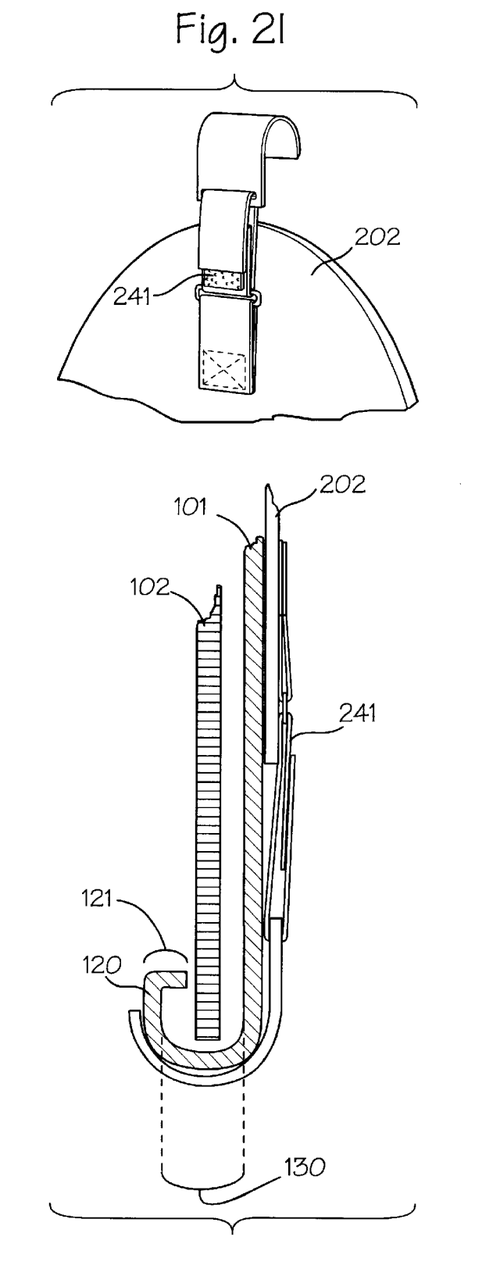

An alternative to a base having extensions is shown in the embodiment in FIG. 2F. Here, a connector comprises a hook, 225, attached to a band of material, said band, 226, which attaches to the base, 202, along the base's outer edge, 204. By 'attachment along' is meant attachment that may extend interiorly from the absolute outmost edge by a sufficient distance to provide strength to the attachment (see, for example, FIG. 2G). Also, slots or holes may be made interior to the outmost edge, and connectors, such as a peg, pin, or hook, then may be inserted into the slots or holes. FIG. 2H shows a peg, 240, attached to the base, 202, and inserting through one of several holes on the band, 226. FIG. 2I shows another means to adjust and attach, namely, having a slot in the hook, 225, through which passes an adjustable band, 226, in this case the adjustment being continuous through the use of hook and loop type fabric, 241. Perspective views of the bands in FIG. 2H and FIG. 2I appear immediately above these figures. Approaches for connector length adjustments, such as these and others known in the art, are suitable in supplying a kit to allow use on a wider range of mirror housings. Also, having several types and sizes of connectors in a kit, with and/or without adjustable bands, allows use on a wider range of mirror housings.

Alternative designs of the hook, 225, are shown in FIGS. 2G, 2H, and 2I. In FIG. 2G, an extended hook, 225E, made of plastic, metal, composite or other rigid or semi-rigid material, has a curved area, 232, wrapping entirely around the bottom, 130, of the mirror housing, 101, and catches onto the peripheral edge, 120. It is noted that the peripheral edge, 120, as shown in FIG. 2G, is the back side, 104, of the mirror housing, 101, contiguous with the bottom, 130. A straight, integral shank, 233, extends upward to engage a band, 226, which is flexible and made of stretchable or non-stretchable linear material. The sizing of the base, 202, the band, 226, and the hook, 225E, are such that, when the hook, 225E, connects to the peripheral edge, 120, there is sufficient tension for the hook, 225E, to retain its position and thereby removably affix the foundation, 201 (comprising the base 202, and its connectors), to the mirror housing, 101.

In structural contrast, FIG. 2H shows a hook where the shank, 233, is shorter, and the band, 226, substantially wraps around the bottom, 130. Finally, FIG. 2I shows a hook, 225, that contacts a bottom portion of, but does not extend up to and over the ledge, 121, which is the top part of the peripheral edge, 120. FIG. 2I also shows one embodiment of an adjustable connector, 230, which uses hook and loop fabric as an adjustable fastening means. Other hook and functionally equivalent fastener designs, such as are known in the art, can achieve substantially the same result in the same way, are covered within the scope of the present invention.

Figure 4:
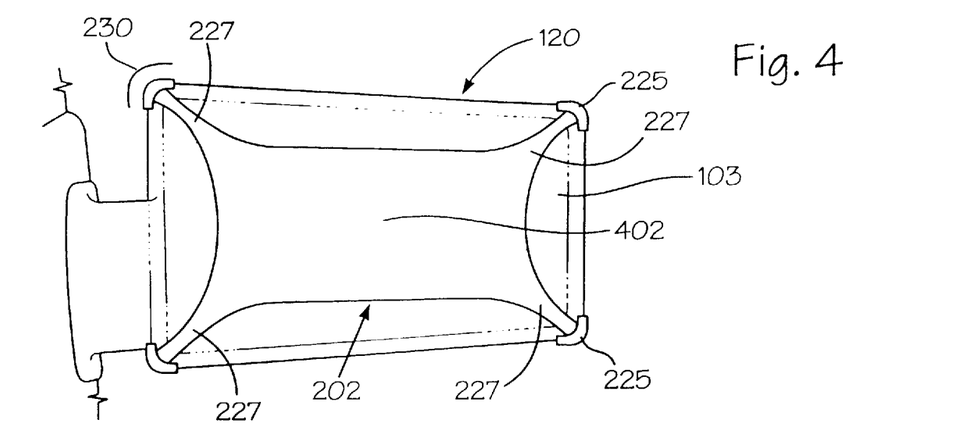
FIG. 4 is a front view of a mirror housing showing one embodiment of the present invention, having four connectors, each directed to a corner of the mirror housing.

The opposite end of the band, 226, is affixed to the base, 202 at or near to the outer edge, 204. The means to affix the band to the hook, and the band, to the base, may be achieved by methods known to those of ordinary skill in the art. It is noted that tension on the base, 202, may be achieved by a combination of tension created by stretching the band, 226, the finger-like extensions of the base, 227 (as shown in FIG. 2E and FIG. 4), and/or the base itself, 202.

Figure 2J:
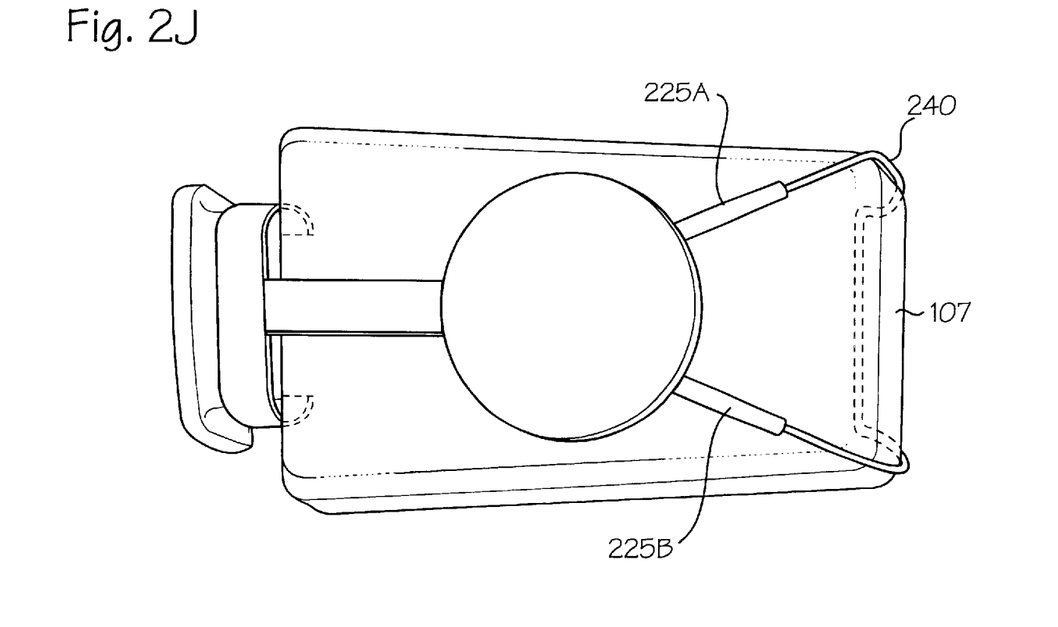

It is noted that hooks may have different configurations as dictated by the intended attachment area and the range of mirror dimensions for which a hook design is intended to function. In this regard, certain hooks are designed for use on the corners of the mirror housings. Here, one feature of the hook is that is it spans to both sides of a geometrical center of the curve, to attach to a section of peripheral edge on both sides of the geometrical center. This provides greater support. It also is noted that the material on the hook that contacts the peripheral edge, 120, may be composed or coated with a substance having a relatively high friction coefficient, so as to enhance the tendency of the hook to remain in place during use at high speeds, during rain, and so forth. Also, another variation of a hook, as shown in FIG. 2J, is a long clip, 240, extending from two bands, 225A and 225B, extends over the distal side, 107, such that a middle portion of the long clip, 240, extends within a portion of the ledge, 121 (shown in FIG. 2I), of the peripheral edge, 120.

When the base, 202, is in final placement on the mirror housing, 101, the art attachment area, 203, contacts and adheres a portion of the back side, 207, of the indicia platform, 205. It is noted that the adherence of the indicia platform, 205, to the art attachment area, 203, can be accomplished by methods now or in the future known to those skilled in the art, and is not limited by the examples set forth in this disclosure. The methods of attachment, as listed above, include, but are not limited to, attachment by sonic welding, riveting, wire or plastic loop fasteners, spot gluing, hot gluing, sewing, the use of snaps, clips, hooks, buttons, magnets, and other such methods of attachment, as are employed in the art, to attach the actual indicia, or the indicia platform, 205, to the base, 202. The adherence can be temporary, such that the indicia platform, 205, is relatively readily removable from the art attachment area, 203, such as by the preferred method using a hooked fabric on one surface and a looped fabric on the second contacting surface (such as "Velcro®"), or more permanent. The effective area of attachment is defined as the actual areas of temporary, semi-permanent or permanent attachment between the base and the indicia platform.

Along similar lines, the actual indicia, 206, may be integral with the indicia platform, 205, such as by printing indicia on a plastic disc, or by other permanent methods. Such indicia integral with the indicia platform may be supplied, as in a kit, so that a user can place the indicia platform onto the base in a single step to replace the indicium. Alternately, the attachment of the actual indicia, 206, to the indicia platform, 205, may be temporary, for instance by the methods indicated above. This also may be used in a kit, when a range of indicia is desired for use, so that the user may replace the indicia from time to time.

Having so described and defined components of the mirror housing and the attachment device, specific embodiments are described with reference to the figures provided herein. Such examples do not show components, such as art attachment areas and indicia platforms. However, such components, and others described above, are understood to be included in the embodiments below, and have been excluded from the drawings for simplification.

Figure 3:
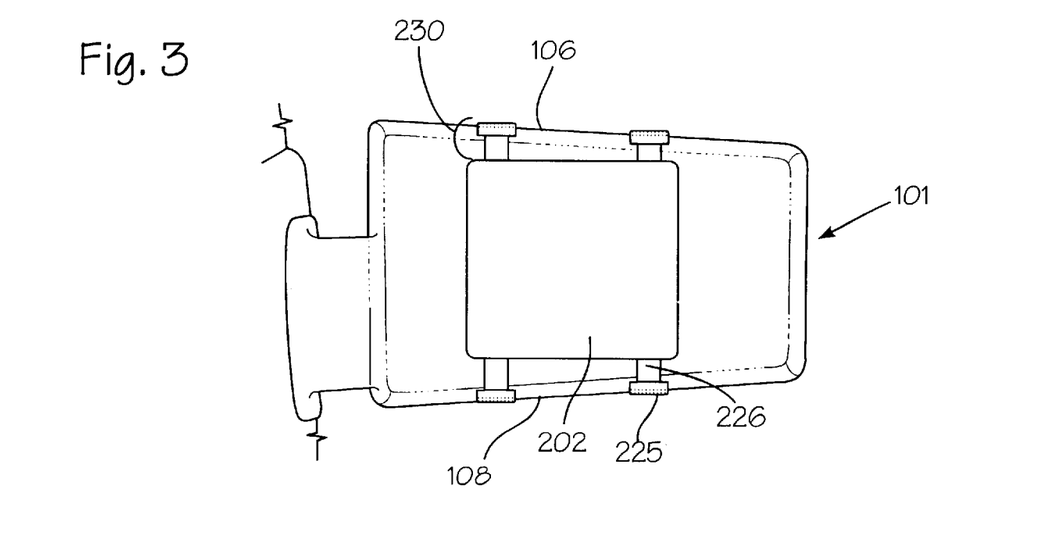
FIG. 3 is a front view of a mirror housing showing one embodiment of the present invention, having two upward and two downward connectors.

In one embodiment of the present invention, shown in FIG. 3, a rectangular base, 202, comprises two top connectors, 230, bearing hooks, 225, oriented to a top side, 106, of said base, and two lower connectors, 230, bearing hooks, 225, oriented to a bottom side, 108, of said base, 202. Each of the four connectors, 230, additionally comprise a band, 226, extending between the base, 202, and the hook, 225. Upon installation onto a mirror housing, 101, the two top connectors, 230, attach to two sections of said top surface of said peripheral edge, 120, and the two lower connectors, 230, attach to two sections of said bottom side of said peripheral edge, 120. This tensions the base onto the front side of said mirror housing.

An indicia platform (not shown) is then attached by fitting over the front surface of the base. Attachment can be achieved by the hook and loop method between the art attachment area, 203, of the base, 202, and the adherence section, 211, on the back of the indicia platform, 205. The hook and loop method is preferred; however other attachment methods fall within the scope of the present invention. As indicated above, either temporary, semi-permanent of permanent attachment of the indicia platform to the base is envisioned under the present invention. An alternative embodiment places indicia directly on a base without a need for a separate indicia platform, 205, and art attachment area, 203.

In another embodiment of the present invention, shown in FIG. 4, a base, 202, comprises a generally rectangular central area, 402, having four finger-like extensions, 227. At the distal end of each finger-like extension, 227, is affixed a connector comprising a hook, 225, suitable for attachment to a corner section of the peripheral edge, 120, of the mirror housing, 101. These hooks, 225, preferably are designed to have a generalized curve and a relatively wide tolerance for fitting over the curved section of a mirror housing. This allows use on a wider range of mirror housing having different corner shapes. The base, 202, is made taut onto the front side, 103, by the stretching of the finger-like extensions, and optionally also of some portion of the generally rectangular central section of the base, 402, which is done in order to attach the hooks (not fully shown) onto the peripheral edge. An indicia platform (not shown) is then attached by fitting over the front surface of the base, thereby completing the attachment device.

Figure 5A:
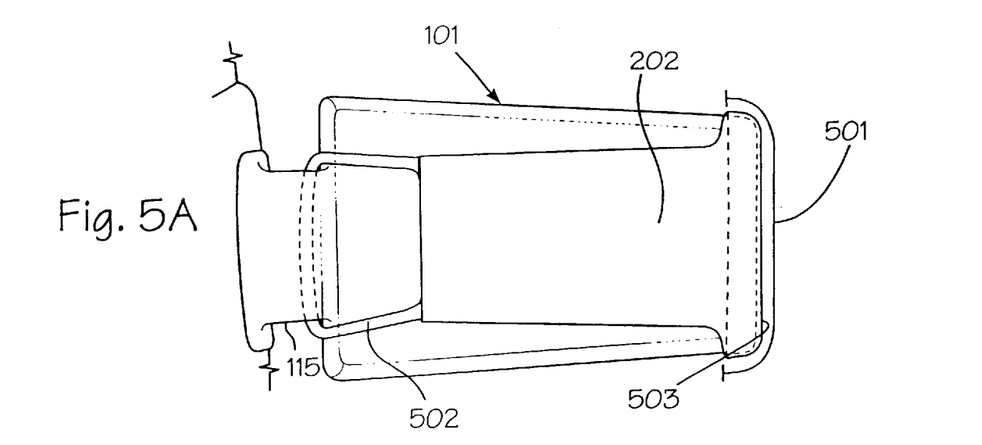
FIG. 5A is a front view of a mirror housing showing one embodiment of the present invention, having an end-cap connector at one end and a loop style connector at the opposite end of the mirror housing.

In another embodiment of the present invention, shown in FIG. 5A, a substantially rectangular base, 202, has a flexible end-cup, 501, as one connector. This is designed to fit over the distal end, 503, of the mirror housing. When pulled taut toward the motor vehicle, the end-cup, 501, surrounds and catches onto the distal end, 503, stabilizing the base, 202, on one end. The end-cup does not substantially block the view of the mirror surface (not shown), preferably covering said mirror surface not more than 3 cm at the mirror surface's outer edge. A preferred material for the composition of the end-cup is stretchable woven nylon.

Regarding the end-cup, the contour of an end-cup can vary, and in some embodiments the end-cup design can be integral with the base structure. This can result in the end-cup structure being continuous with the base, and covering a substantial portion of the front side, 103, of the mirror housing, 101.

Another embodiment comprises a sock-like indicia-bearing structure comprising a stretchable nylon base comprising a first opening by which the structure is slipped over the mirror housing, and a second opening that, upon assembly on a mirror housing, surrounds, but does not block, the mirror surface. This sock-like indicia-bearing structure additionally comprises either an indicium integral with the base, or an indicia platform or separate indicium that attaches to a front portion of said indicia-bearing structure. The indicia-bearing structure may also additionally comprise a semi-rigid support border, such as a flexible wire impregnated into the border of the second opening, to better align this opening to avoid covering the mirror surface. A further modification is having two or more spaced gaps between support border and the body of the base, such that corners of the mirror housing may occupy such gaps upon assembly, thereby helping situate the indicia-bearing structure. Limitations disclosed for other embodiments described in the present disclosure also may be applied to this embodiment.

Regarding FIG. 5A, a second connector is an inwardly disposed loop, 502, composed preferably of stretchable material, and alternatively of non-stretchable material. To assemble onto a mirror housing, 101, the loop, 502, encircles the connecting structure, 115, and the flexible end-cup is stretched over the distal end. By 'distal end' is included the top and bottom corners of the distal end. As previously noted, the indicia platform (not shown) is then attached by fitting over the front surface of the base, thereby completing the attachment device.

A loop may be of stretchable or non-stretchable material. The loop may be permanently affixed to the base at one or both ends. Preferably, the loop has a means to adjust the effective loop size. This can be accomplished by means known to those of ordinary skill in the art, including but not limited to a pair of friction hoops holding one or both loop ends, or holes spaced at the free end of the loop, and a stub fixed on the base, 202, to removably enter one of such holes.

Figure 5B:
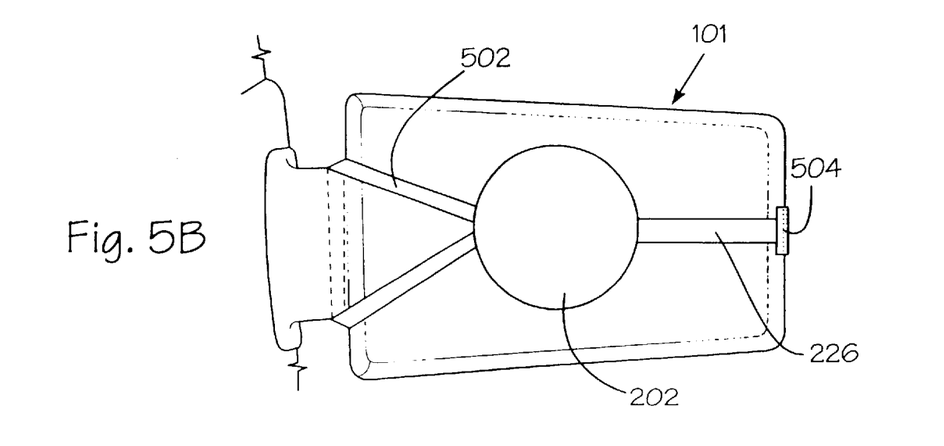
FIG. 5B is a front view of a mirror housing showing one embodiment of the present invention, having a single band and hook connector at one end and a loop style connector at the opposite end of the mirror housing.

Another embodiment using a loop around the connecting structure is shown in FIG. 5B. Here, the loop, 502, attaches to a circular base, 202, and a second connector is comprised of a wide hook, 504, centered along the distal side, 107, and a band, 226, which attaches and extends between the base, 202, and the wide hook, 504. It is noted that, for this and other embodiments of the present invention, a band, 226, may split at a point distant from its connection to the base, 202, into two or more bands that each end in attachment to a connector. For example (not shown), the band, 226, in FIG. 5B alternately could bifurcate into two parts, each part ending in a corner hook such as is shown in FIG. 4 at corners 109B and 109C.

Figures 6A, 6B, 7:
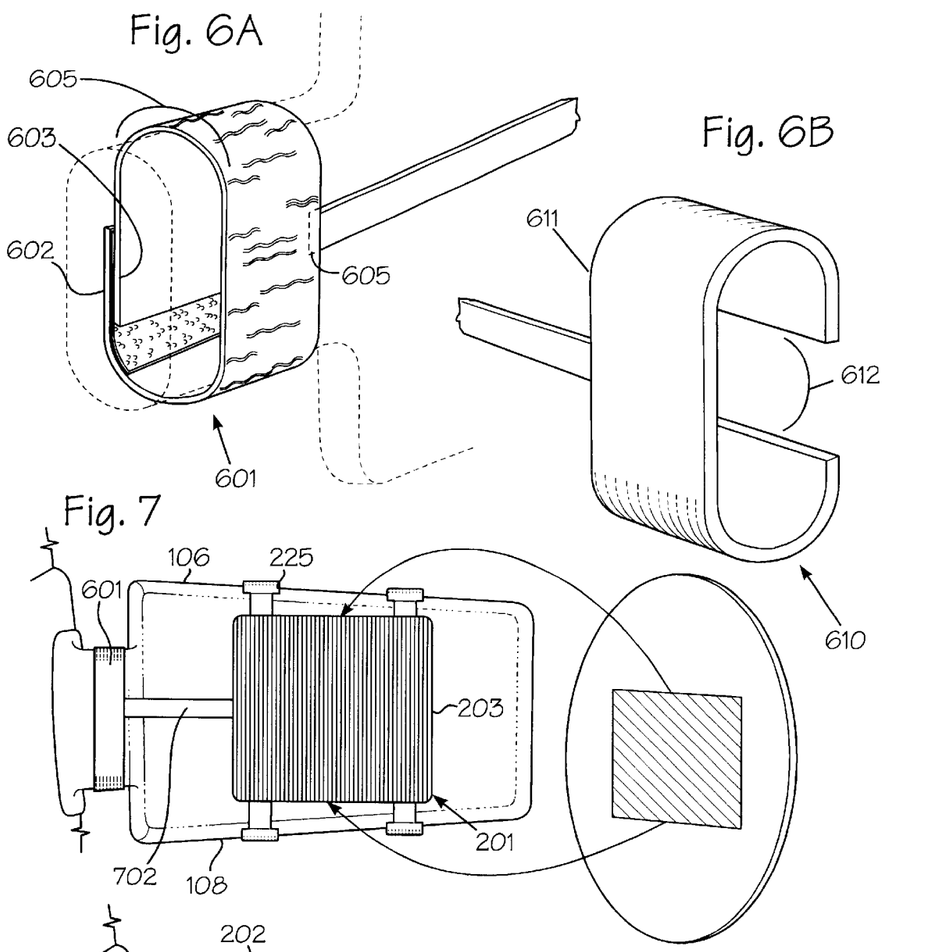

Another feature of the present invention is a brace. One type of brace is shown in FIG. 6A. This brace, 601, is a loop of generally flat or thin material that wraps around the connecting structure, 115 (not shown). The brace, 601, is comprised of a first end, 602, a second end, 603, and a span, 604, of said material between and integral with (i.e., attached to or of the same original piece of material) the first and second ends. The first end, 602, has attachment means to the second end, 603 and/or to the span, 604, and the second end, 603, optionally has attachment means matching that means of the first end, 602. The brace attaches to the base, 202, a fingerlike extension of the base, 202, or to a lateral extension, 702 (FIG. 7), at a section, 605, along the span, 604. Through that attachment and the adjustable, removable attachment around the supporting structure (by tightening the brace, 601, around the supporting structure, 115), the stability of the foundation, 201 (comprising the base, 202, and its connectors), or of the overall attachment device, 200 (for instance, comprising the base, 202, its connectors, and indicia on an indicia platform, 205), is enhanced. The brace, 601, is tightened around the connecting structure, 115, by means known to those skilled in the art, including the use of reversible fasteners such as hook and loop, snaps, standard hooks and clips, buttons, and so forth.

A second form of brace is depicted in FIG. 6B. This brace, 610, comprises a plastic clip, 611, having an opening, 612. The brace is made of sufficiently flexible, yet semi-rigid material so that the opening, 612, can expand around a connecting structure, 115 (FIG. 7). Thus during installation the opening expands sufficiently to snap around the connecting structure of a mirror housing, such that the brace:, 610, thereby encircles a portion of the connecting structure. The brace, 610, is suitably connected to the base, 202, by means described herein and otherwise known to those skilled in the art.

FIG. 7 shows a preferred embodiment of the present invention that utilizes the brace depicted in FIG. 6A. A substantially rectangular base, 202, having an art attachment area, 203, that extends entirely across the surface to the outer edge, 204. The art attachment area is comprised of loop material that matches and attaches to hook material of the hook and loop type fastener. Attached approximately 0.5 inches from the corners of the base, 202, are four hooks, two along the top side, 106, and two along the bottom side, 108, all four shown as 225. Attached to one side of the base, 202, is a lateral extension, 702. This communicates with the brace, 601. Thus, upon installation, the four hooks, 225, stretch the base, 202, up and down, and the brace, 601, secures the base to the connecting structure. An indicia platform, 205 is attached to the art attachment area, 203.

Figure 8:
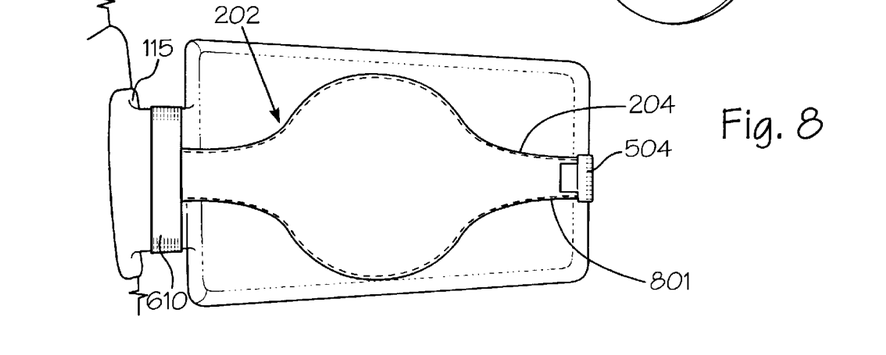
FIG. 8 is a front view of an embodiment having a wire support around the edges of the base.

FIG. 8 exemplifies another embodiment utilizing a brace. One end of a substantially oval base, 202, attaches directly to a brace, 610. The opposite end of the base, 202, attaches directly to a wide hook, 504. For this and for other embodiments, for further stabilization of the outer edge, 204 a semi-rigid or rigid wire, 801, or other supporting material, may be placed above or within the base area near the outer edge, 204.

In accordance with another aspect of the present invention, kits are provided to supply components and instructions to a user who may then use the kit to install one or more attachment devices to one or more exterior mirror housings of a motor vehicle. One embodiment of a kit comprises at least one base and at least two connectors according to the present invention, and instructions for installation onto a mirror housing. Another embodiment additionally includes at least one indicia platform and, at a minimum, a corresponding number of removable indicia.

In accordance with another aspect of the invention, a method of displaying indicia on an exterior mirror of a motor vehicle includes the following steps:

1. obtaining a device attachable over a portion of a front surface of the exterior mirror; and
2. attaching the device onto the portion of the front surface, where the device contains indicia for display or such indicia is affixable to the device.

Other aspects of the present invention are worth mention. For instance, the indicia platform may have folds or predetermined bends in it to conform with the front sides of mirror housings, that have distinct bends. Also, the indicia platform may have additional indicia showing on the visibly exposed portions of the back side of the platform, such that such additional indicia are viewable from the rear side of the mirror housing and vehicle.

Having described a number of embodiments of the present invention, the following examples are provided to describe field-testing of the present invention.

EXAMPLE 1

An attachment device according to the present invention was manufactured using a neoprene material stretchable in two dimensions for a base, a lateral extension, and most of a brace. The base was rectangular, approximately 5 inches wide and 7.25 inches tall. The entire front surface of the base contained hook-surfaced material, constituting the art attachment area. Extending from the base was the rectangular lateral extension, approximately 2.25 inches tall and 2.5 inches wide, extending between and connecting the base and a brace. The brace measured approximately 16 inches long and 1.75 inches wide. The last 1.5 inches of the brace was a sewn-on section of loop-surfaced fabric, and the remainder of the brace, on the same side as the loops, comprised hooks matching the loops, the hooks being on the stretchable neoprene material.

Four metal hooks were attached approximately 0.5 inches from each corner of the base, two on the top surface and two on the bottom surface of the base. These hooks comprised the four connectors of the device. To install the device, the hooks were attached to four sections of the mirror housing peripheral edge, two sections on the top side and two sections on bottom side of the mirror housing. The hooks were placed to stretch and tauten the base material. The brace was wrapped around the connecting structure that connects the mirror housing to the car, stretched to tighten the brace- material, and the two ends of the brace were connected together under tension with the hook and loop fastening method. The indicia platform, bearing a rectangular section of loop material (approximately 2×4 inches) adhered to the back center of the indicia platform, was attached centrally to the art attachment area. This created an effective area of art attachment on the base of 2×4 inches.

The indicia platform for the first trial was a plastic disc approximately 7.5 inches in diameter. The attachment device, as described above, was driven on an interstate highway for approximately 80 miles at approximately 80 miles per hour (mph). Upon inspection after this trial the indicia platform remained attached in the same condition as when the trial began. No noise was noticed to have been made during the trial by the attachment device.

EXAMPLE 2

The same base, lateral extension, and brace were used as described above in Example 1. The indicia platform attached to the base was football-shaped, approximately 9 inches maximum width and approximately 5.5 inches maximum height.

The attachment device was driven on an interstate highway for approximately 5 miles at an average speed of 90 mph. Upon inspection after this trial the indicia platform remained attached in the same condition as when the trial began. No noise was noticed to have been made during the trial by the attachment device.

EXAMPLE 3

The same base, lateral extension, and brace were used as described above in Example 1. The indicia platform attached to the base was a thin plastic disc, approximately 8.5 inches in diameter.

The attachment device was driven on an interstate highway for approximately 5 miles at an average speed of 80 mph. Upon inspection after this trial the indicia platform remained attached in the same condition as when the trial began. No noise was noticed to have been made during the trial by the attachment device.

These examples demonstrate that a range of sizes and shapes of indicia platform, where such indicia platform extend beyond the effective area of attachment between the base and the attachment site on the indicia platform, remain acceptably positioned after trials at relatively high speeds. This indicates the achievement of the goal of withstanding the effects of high speeds without substantially shifting its position, falling off, or making undesirable noise.

It is noted that the Figures depicting this invention are merely representative of particular embodiments and are not meant to limit the range of possible configurations. The features are represented and described by numbers consistent from drawing to drawing, where possible.

Having generally described this invention, including the best mode thereof, those skilled in the art will appreciate that the present invention contemplates the embodiments of this invention as defined in the following claims, and equivalents thereof. However, those skilled in the art will appreciate that the scope of this invention should be measured by the claims appended hereto, and not merely by the specific embodiments exemplified herein. Those skilled in the art will also appreciate that more sophisticated technological advances will likely appear subsequent to the filing of this document with the Patent Office. To the extent that these later developed improvements embody the operative principles at the heart of the present disclosure, those improvements are likewise considered to come within the ambit of the following claims.

What is claimed is:

1. A foundation device for displaying indicia on an exterior mirror housing of a motor vehicle, said mirror housing comprising a front side, a back side comprising a mirror surface, a peripheral edge around said mirror surface, and a connecting structure to attach said mirror housing to said motor vehicle, said foundation device comprising:
 a. a base of stretchable material, superposable on a portion of said front side, comprising at least one art attachment area for displaying said indicia and an outer edge; and
 b. at least two connectors, opposingly disposed along said outer edge, each of said connectors connecting to said base;
 wherein upon placement of said foundation device onto said mirror housing by said at least two connectors, said indicia is viewable from the front of said motor vehicles.

2. The foundation device of claim 1, said indicia being made integral with said foundation.

3. The foundation device of claim 1, said indicia being attachable to said foundation.

4. The foundation device of claim 1, wherein said base is substantially non-stretchable and at least two of said at least two connectors is comprised of a stretchable band.

5. A device for displaying indicia on an exterior mirror housing of a motor vehicle, said mirror housing comprising a front side, a back side comprising a mirror surface, a peripheral edge around said mirror surface, and a connecting structure to attach said mirror housing to said motor vehicle, said device comprising:
 a. a base of stretchable material, superposable on a portion of said front side, comprising at least one art attachment area for displaying said indicia and an outer edge;
 b. an indicia platform bearing indicia, attaching to said at least one art attachment area; and
 c. at least two connectors, opposingly disposed along said outer edge, each of said connectors connecting to said base;
 wherein upon placement of said device onto said mirror housing by said at least two connectors, said indicia is viewable from the front of said motor vehicle.

6. The device according to claim 5, wherein each of said connectors additionally comprise a hook removably attachable to a section of said peripheral edge of said mirror housing.

7. The device according to claim 6, comprising two top connectors bearing hooks oriented to a top side of said base, and two lower connectors bearing hooks oriented to a bottom side of said base, wherein upon installation onto a mirror housing said two top connectors attach to two sections of said top surface of said peripheral edge, and said two lower connectors attach to two sections of said bottom side of said peripheral edge, thereby tensioning said base onto said front side of said mirror housing.

8. The device according to claim 6, comprising four connectors, each said connector attaching to a corner section of said peripheral edge, thereby tensioning said base from which said connectors extend.

9. The device according to claim 5, comprising a first connector comprising a flexible end-cup removably formidable over a distal end of said mirror housing oppositely disposed from said connecting structure, and a second connector disposed toward and attachable around said connecting structure, wherein upon installation onto a mirror housing said flexible end-cup covers said distal end, and said second connector attaches around said connecting structure, thereby tensioning said base onto said front side of said mirror housing.

10. The device according to claim 9, wherein said second connector comprises a loop having a length of material extendable from said base to and around said connecting structure, such that said loop, upon installation, encircles said connecting structure.

11. The device according to claim 10, additionally comprising a means of adjusting said length of said loop.

12. The device according to claim 9, wherein said second connector comprises a brace for removable attachment around said connecting structure, said brace comprising a joining means having a first end, a second end, and a span of material between and integral with said first and second ends, wherein upon installation upon said mirror housing, said span of material encircles said connecting structure, and said first and second ends are attached to one another to help secure said device to said mirror housing.

13. The device according to claim 5, comprising a first connector comprising a flexible cup formidable over a distal end of said mirror housing oppositely disposed from said connecting structure, and a first and a second inward corner connectors, each of said first and second inward corner connectors bearing a hook for attachment to a section of said peripheral edge, said first corner connector attachable to a first corner section of said peripheral edge positioned above said connecting structure, and said second corner connector attachable to a second corner section of said peripheral edge positioned below said connecting structure, wherein upon installation onto a mirror housing said flexible cup covers said distal end, and said first and second inward corner connectors attach to said first and second corners, thereby tensioning said base onto said front side of said mirror housing.

14. The device according to claim 5, wherein said second connector comprises a brace for removable attachment around said connecting structure, said brace comprising a joining means having a first end, a second end, and a span of material between and integral with said first and second ends, wherein upon installation upon said mirror housing, said span of material encircles said connecting structure, and said first and second ends are attached to one another to help secure said device to said mirror housing.

15. The device according to claim 14, wherein said first and second ends attach to one another by a hook and loop fastening system.

16. The device according to claim 15, additionally comprising a lateral extension that connects said base with said brace.

17. The device according to claim 16, wherein at least one connector additionally comprises a hook removably attachable to a section of said peripheral edge of said mirror housing.

18. The device according to claim 17, comprising two top connectors bearing hooks oriented to a top side of said base, and two lower connectors bearing hooks oriented to a bottom side of said base, wherein upon installation onto a mirror housing said two top connectors attach to two sections of said top surface of said peripheral edge, and said two lower connectors attach to two sections of said bottom side of said peripheral edge, thereby tensioning said base onto said front side of said mirror housing.

19. The device according to claim 15, wherein said base extends laterally to connect with said brace.

20. The device according to claim 14, wherein at least one connector additionally comprises a hook at its distal end for attachment to a section of said peripheral edge, and one connector comprises said brace, such that upon installation onto said mirror housing each said hook attaches to said mirror housing at said section of said peripheral edge, and said brace attaches around said connecting structure, such that upon installation said base is positioned tautly.

21. The device according to claim 6, wherein said at least one connector comprises a corner hook attachable to a corner section of said mirror housing, said corner hook structured to extend over both sides of a point defining a center of said corner.

22. The device according to claim 5, comprising a first connector comprising a flexible cup formidable over a distal end of said mirror housing oppositely disposed from said connecting structure, and a second connector attachable around said connecting structure, wherein upon installation onto a mirror housing said flexible cup covers said distal end, and said second connector attaches around said connecting structure, thereby tensioning said base onto said front side of said mirror housing.

23. The device of claim 5, wherein said base is substantially non-stretchable and at least two of said at least two connectors is comprised of a stretchable band.

* * * * *